March 9, 1965   T. T. LUNDE   3,172,543
CARGO BURTONING APPARATUS
Filed April 9, 1962   6 Sheets-Sheet 1

FIG_1

FIG_2

FIG_4

FIG_5

INVENTOR.
THOMAS T. LUNDE
BY
Hoppe and Mitchell
ATTORNEYS

March 9, 1965 T. T. LUNDE 3,172,543
CARGO BURTONING APPARATUS
Filed April 9, 1962 6 Sheets-Sheet 2

INVENTOR.
THOMAS T. LUNDE
BY
ATTORNEYS

March 9, 1965 T. T. LUNDE 3,172,543
CARGO BURTONING APPARATUS
Filed April 9, 1962 6 Sheets-Sheet 3

FIG_6

INVENTOR.
THOMAS T. LUNDE
BY
Hoppe and Mitchell
ATTORNEYS

United States Patent Office 3,172,543
Patented Mar. 9, 1965

3,172,543
CARGO-BURTONING APPARATUS
Thomas T. Lunde, 233 Cervantes Blvd.,
San Francisco, Calif.
Filed Apr. 9, 1962, Ser. No. 186,115
10 Claims. (Cl. 212—3)

This invention relates generally to shipboard apparatus for hoisting, lowering and otherwise moving heavy cargo and relates more particularly to improved apparatus for burtoning extremely heavy cargo utilizing improved light-weight towers supporting a plurality of lifting booms and suspended multiple lifting tackles.

Heretofore, heavy lift cargo handling apparatus comprised extremely heavy swinging booms stepped on the vessel centerline and employed heavy duty tackles and costly and exceptionally top-heavy single-piece masts or king posts. It is not possible to burton loads with such apparatus; heel fitting failures are frequent because the boom pivots under load; rigging of the apparatus is time consuming and normally immobilizes adjacent supplemental cargo handling gear; and the pendulum action of the load makes load spotting extremely difficult. Other disadvantages of previous expedients include vessel instability resulting from the high center of gravity of the cargo handling apparatus; and deck obstruction by vang anchoring and rigging means.

One object of this invention is to provide a heavy lift burtoning apparatus requiring no rotation of the heel pins under load.

An object of this invention is to provide an improved lightweight tower for supporting multiple booms and lifting tackles useful for burtoning extremely heavy cargo.

Another object of the present invention is to provide a lightweight tower design having a minimum effect on the center of gravity of the vessel upon which it is mounted and providing a clear straight-ahead view along the vessel centerline.

An object of this invention is to provide multiple booms and tackle rigged for heavy lift burtoning which are concurrently available for rapid burtoning of lighter loads.

A further object of this invention is to provide a heavy lift burtoning apparatus which by suspending the load from multiple booms with two tackles joined at the load eliminates all pendulum action of the cargo hook.

Another object of the invention is the provision of self-supported towers for supporting heavy lift tackles and booms having elevated vang anchors to provide deck clearance.

Still another object of the present invention is to provide an improved heavy lift burtoning apparatus including a light-weight tower in combination with multiple light-weight booms and suspended lifting tackles.

Heavy lift boom head fittings and rigging which impart substantially no torsion to the boom heel fittings also are an object of the invention.

Other objects and advantages of the invention will become apparent upon a consideration of the following description of a selected embodiment of the invention and the accompanying drawings wherein.

Improved towers employed in the present invention are illustrated in FIGS. 1–5. Each tower comprises a self-supporting assembly of light-weight tubular members. Truss design of the towers reduces the top-side weight of the cargo handling apparatus to some 40% under that for single-piece masts or king posts of the same capacity. In addition, the capacity of each tower need be only half that required in swinging boom designs. This weight reduction results in a lower center of gravity and increased vessel stability. The truss design employing a plurality of small diameter members obstructs a minimum of horizon. The embodiments illustrated in FIGS. 1–5 provide an unobstructed straight-ahead view along the vessel centerline. Moreover, the initial cost of the described structures is minimized by use of standard steel pipe for the various tubular members.

Each tower, referred to generally as 1, comprises a self-supporting central quadruped structure with outrigger sections on each side. The central structure includes four vertically disposed legs 2 rigidly secured to the vessel deck 3 or to the longitudinal girders of the vessel which underlie and support the deck. The legs for each side of the tower both lie in a vertical plane longitudinal with respect to the vessel centerline and are canted inwardly toward the upper end, as appears in FIG. 1. The legs are joined at the upper ends by horizontal top cross members 4. Diagonal and cross-bracing referred to generally as 5, provide additional fore-aft stability. Internal diagonal members 6 extending from a point on each leg adjacent to the boom heel fittings 7 join at the top center of the tower on the vessel longitudinal centerline. These internal diagonals 6 along with cross-bracing, referred to generally as 8, provide athwartships tower stability. The triangular shaped opening defined by the internal diagonals 6 provides straight-ahead visibility along the vessel centerline.

Each tower includes an integral outrigger section extending to each side of the vessel to which the vangs of the several cargo booms are anchored. These outrigger sections not only lend stability to the central quadruped structure but also provide elevated vang anchors. The outrigger sections each include horizontal members 9 extending from each of the adjacent tower legs 2 outwardly to the vessel sides where each connects to a supporting vang post 10 mounted vertically on the vessel deck. Diagonal members and cross-ties 11 provide fore-aft stability to each outrigger section. Horizontal members 9 are positioned well above the vessel deck to provide clearance for the movement of cargo along the deck without interference with the tower or vang rigging. In the illustrated tower structure, the horizontal members 9 are at the elevation of the boom heel fittings 7 and are extensions of the bottom horizontal cross members 12 of the central quadruped tower structure.

Figure 1:
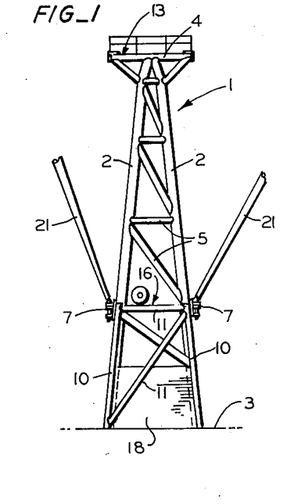
FIG. 1 is a side elevational view of an improved tower embodying features of the present invention with various rigging deleted for clarity of illustration.
Figure 2:
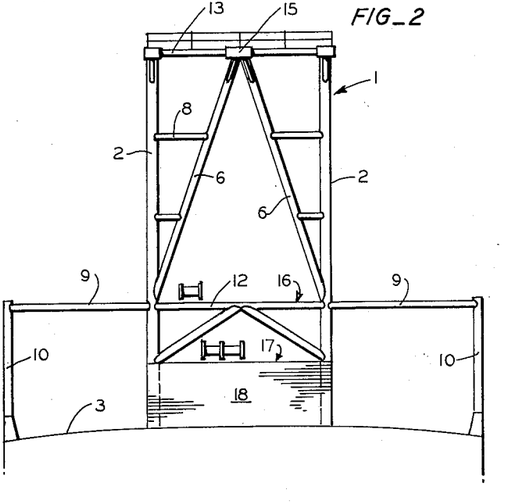
FIG. 2 is an end elevational view of the tower of FIG. 1 taken transversely with respect to the vessel centerline with the appurtenant booms and rigging broken away for clarity of illustration.
Figure 3:
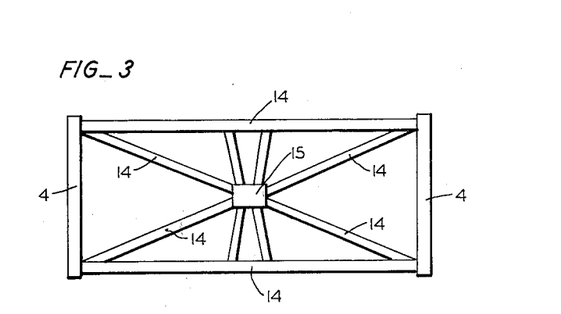
FIG. 3 is a top plan view of the tower of FIG. 1.

The top plan view of the tower, FIG. 3, illustrates the support for a topping lift access platform 13 mounted on the central quadruped structure and diagonal and cross bracing 14 lying in the plane of top horizontal cross members 4 which join the upper ends of each leg 2 to the center plate 15 to which the internal diagonals 6 are also joined.

The tower legs 2 support one or more platforms 16, 17 upon which the cargo winches and other gear are mounted. A mast house 18 may enclose the legs at deck level.

The foregoing tower design provides a light-weight extremely stable structure upon which the cargo booms 21 are stepped and the topping lifts and vangs anchored. The described design is useful for lifting loads up to 150–200 tons and already has been used to lift loads in excess of 90 tons. Such loads are many times the capacity of cargo burtoning apparatus heretofore in use.

Figure 4:
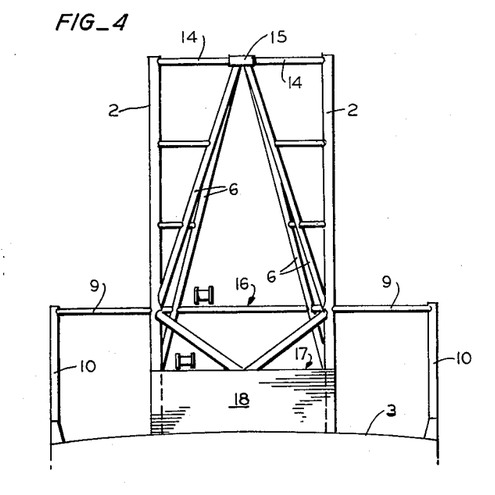
FIG. 4 is a side elevational view of a modified form of tower for supporting booms and rigging on one side only.
Figure 5:
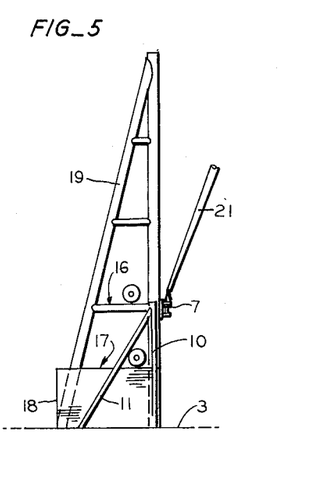
FIG. 5 is an end elevational view of the tower of FIG. 4 taken transversely with respect to the ship centerline.
Figure 6:
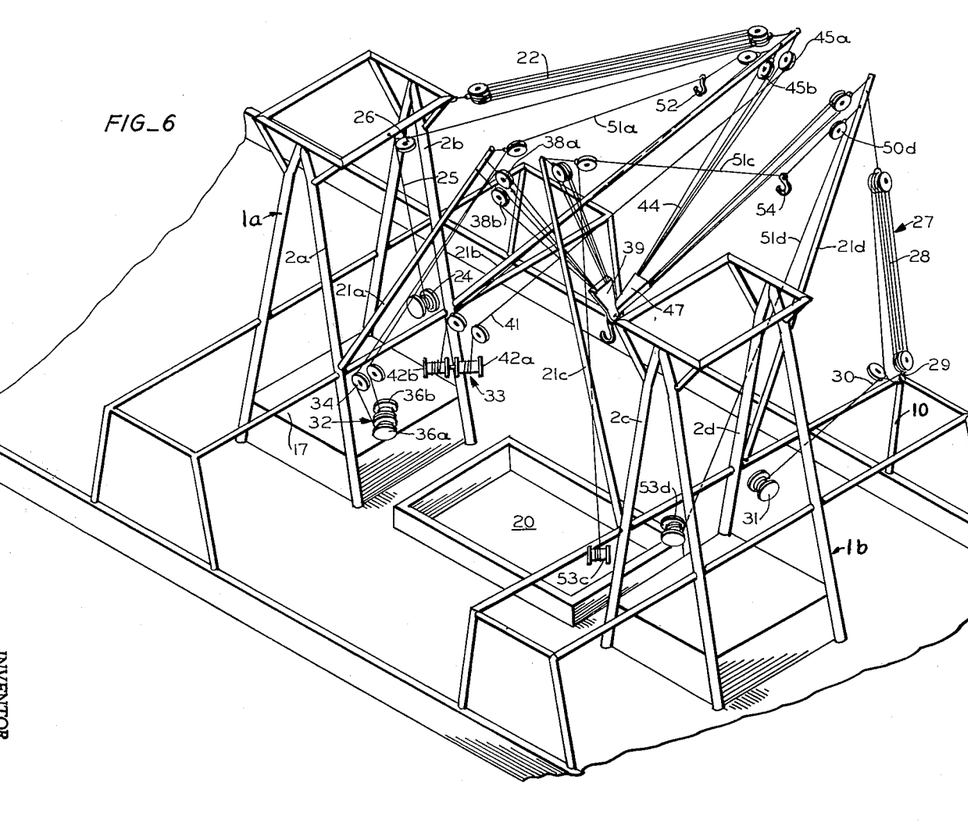
FIG. 6 is a diagrammatic perspective view of a complete burtoning apparatus embodying features of the present invention.

FIGS. 4–5 illustrate a modified form of tower useful for handling cargo at the end hatches of a vessel where booms are stepped only on one side of the structure as illustrated in FIG. 5. The central quadruped structure includes a pair of vertical legs 2 spaced on an athwartships line and a pair of canted legs 19 all mounted on the vessel deck 3 and joined at the top end to provide stability. Four internal diagonals 6 each extend from a point near the foot of each of legs 2, 19 to the top center of the tower on the vessel longitudinal centerline where they are joined to center plate 15 secured to the top ends of the legs 2, 19 by horizontal cross-ties 14. Outrigger sections extend outwardly from the tower legs 2 to each side of the vessel. These outrigger sections include horizontal members 9 connected at the outboard end to vertical vang posts 10 mounted vertically on the vessel deck 3. A diagonal member 11 provides fore-aft stability to the vang post and each outrigger section. The horizontal members 9 also are positioned well above the vessel deck to provide clearance for cargo and movement of cargo handling vehicles along the deck without interference with the tower or vang rigging. The tower legs support similar operating platforms 16, 17 and mast house 18.

Referring to FIGS. 6–9, two towers 1a and 1b, respectively, are mounted fore and aft of each cargo hatch 20 through which cargo is to be handled. Towers of the design illustrated in FIGS. 1–3 can handle cargo from hatches on either side whereas the towers illustrated in FIGS. 4–5 handle cargo from only one side and normally are placed adjacent to the end hatches of the vessel. Each type of tower supports at least a pair of cargo booms 21.

In the embodiment illustrated in FIGS. 6–9 four cargo booms are stepped on the legs of the two towers adjacent to hatch 20. Booms 21a, 21b are stepped from legs 2a, 2b of tower 1a, respectively, and booms 21c, 21d on legs 2c, 2d of tower 1b. Heavy duty boom heel swivel fittings 7 (see FIG. 1) on each leg support the booms. Such fittings enable each boom to swing in a vertical arc of about 90° upwardly from the horizontal and in a horizontal arc of about 180°. The boom heel swivel fittings are of conventional design having the familiar gooseneck and pinned boom heel fitting, with a heavy duty capacity to handle the extremely heavy loads contemplated within the scope of the present invention.

A separate topping lift assembly independently raises or lowers the head of each boom. Each topping lift assembly comprises a multiple part topping lift tackle interconnecting the head of each boom and the top of its respective supporting tower, a topping lift leadline and a separate topping lift winch for operating the leadline. To avoid confusion of lines typical topping lift assemblies are illustrated only in FIG. 6 for boom 21b and in FIG. 8 for booms 21a and 21b. However, it is to be understood that each boom is provided with a similar topping lift assembly.

Figure 8:
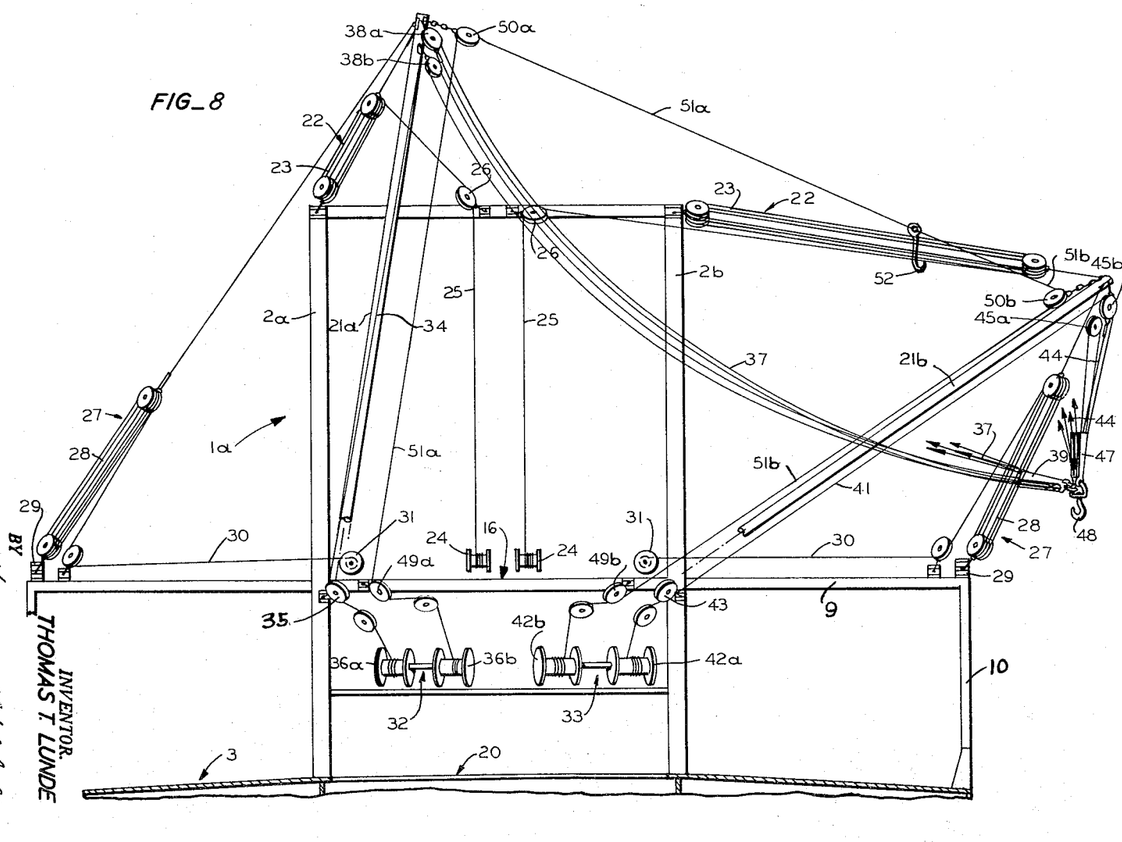
FIG. 8 is an elevational view of the apparatus illustrated in FIG. 6.

The typical topping lift assembly 22, most clearly seen in FIG. 8, includes a multiple part topping lift tackle 23 interconnecting the boom head and the top of the respective supporting tower 1a at a point directly over the boom heel. A topping lift winch 24 mounted on platform 16, a topping lift leadline 25 for operating the topping lift tackle 23, and a single block 26 mounted on the top of the tower at the vessel centerline for guiding the leadline, complete each assembly. Although the single topping lift blocks 26 are illustrated as being mounted inboard of the heel of their respective booms to develop an inboard guying component on the boom, the single blocks also may be located directly over the boom heel or at any intermediate point. A split topping lift also may be utilized to gain additional inboard guying force.

Figure 7:
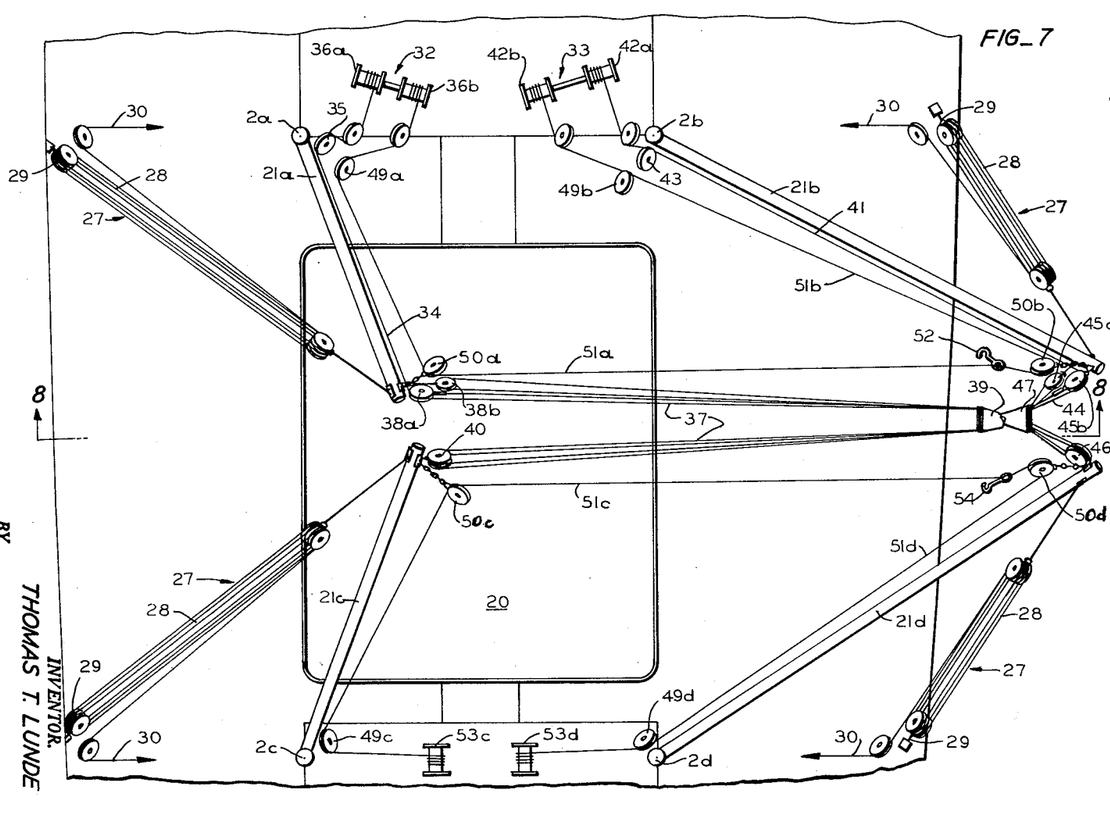
FIG. 7 is a diagrammatic plan view of the apparatus illustrated in FIG. 6.

Movement of each boom in a horizontal arc is independently controlled by a separate vang anchored to one outrigger section of the supporting towers 1a, 1b. Each vang assembly comprises a vang tackle, a vang leadline, and a separate vang winch. Again, to avoid confusion of lines vang assemblies 27 are illustrated only for several booms in FIGS. 6, 8; however, the vang assembles for each boom are illustrated in FIG. 7 for the cargo hatch 20 under consideration.

Each vang assembly comprises a vang tackle 28 interconnecting the boom head and an anchor pad on one outrigger section of each tower generally positioned on top of vang post 10 as at 29. Vang leadlines 30 extend from each vang tackle to a separate vang winch 31 also mounted on platform 16. As illustrated the vang anchor pads 29 are located coaxially with an athwartships line passing through the boom heels but this is not essential. With such orientation a load suspended from the booms may be spotted in a direction parallel to the longitudinal axis of the vessel merely by operating the appropriate topping lift. The corresponding vang need not be adjusted.

Booms 21a, 21b, 21c and 21d, their supporting towers 1a, 1b and the operative rigging cooperate to permit the handling of extremely heavy cargo. At one end of the hatch, for example on platform 17 supported on tower 1a, are a double-drum cargo winch 32 adjacent to the heel of boom 21a and a similar double-drum cargo winch 33 mounted adjacent the heel of boom 21b. A cargo leadline 34 reeved in heel block 35 is wound on one drum 36a of cargo winch 32. The leadline operates a first multiple part lifting tackle 37 suspended from the heads of booms 21a and 21c. The lifting tackle 37 includes separate blocks 38a, 38b swiveled on the head of boom 21a from which the tackle reeved in a first traveling block 39 is suspended. The lifting tackle also is suspended from multiple block 40 swiveled on the head of boom 21c.

A leadline 41, wound on one drum 42a of the second cargo winch 33 and reeved in heel block 43 on boom 21b, operates a second cargo lifting tackle 44 similarly suspended from the heads of booms 21b and 21d. This tackle also comprises a pair of single blocks 45a, 45b mounted on the head of boom 21b and a multiple block 46 swiveled on the head of boom 21d fom which the multiple part tackle depends to a second traveling block 47. The two traveling blocks 39, 47 jointly carry a swiveled cargo hook 48.

A load secured to the cargo hook 48 is raised, lowered or moved athwartships by synchronization of the cargo winches 32, 33. At all times the load is suspended from at least two booms thereby permitting lighter boom design than would otherwise be possible for a load of given weight. The mechanical advantage of the lifting tackles may be varied as desired within the physical limits of the booms and cables by varying the number of cable strands in the pulley system supporting the load.

With the described apparatus, heavy cargo can be burtoned from the hold of the ship through hatch 20 by positioning the booms substantially as shown in FIG. 6–8, or 9. Operation of drum 36a of cargo winch 32 raises the load by means of lifting tackle 37 from the hold to an elevation above the hatch sufficient to clear the hold and deck while winch drum 42a takes up slack in lifting tackle 44. At this point the winch 42a and booms 21b and 21d assume an increasingly greater share of the load while winch 36a slacks off, thereby moving the load athwartships until it is suspended entirely from booms 21b and 21d. Thereupon, both winches slack off lowering the cargo to the dock.

With the foregoing apparatus no more synchronization of winches in required than is necessary for an ordinary burtoning operation in spite of the fact that extremely heavy lifts are made and multiple booms are utilized. This greatly simplifies the burtoning operation as compared with present expedients for making heavy lifts. The controls for the several winches are consolidated at a single operating station normally on platform 17 upon which cargo winches 32, 33 are mounted. From this single station a winch man can operate the topping lifts and vangs for each of the nearside booms 21a, 21b, as well as cargo winches 32, 33. Transfer control of the vang and topping lifts for the farside booms 21c, 21d also is provided at this station with duplicate controls also on the farside. This consolidation of winch controls enables a single operator without moving from this one operating station to set all four booms in any position; to top or lower any of the four booms, even under load; and to burton and spot cargo at any point within the reach of the booms.

In addition, it will be observed that since the load is suspended from tackles 37 and 44 joined at a single point, cargo hook 48, the load does not swing as will a load burtoned by conventional burtoning methods. This complete prevention of pendulum action of the load eliminates the attendant problems in load spotting and personnel safety. Nonetheless, the load may be rotated on the swiveled cargo hook 48 for ease in spotting.

Each side of hatch 20 also is provided with a concurrently rigged single whip burton mounted upon its respective booms. With reference to FIG. 8 for tower 1a, one single whip burton includes the second drum 36b of cargo winch 32, heel block 49a and head block 50a mounted on boom 21a, lead 51a terminating at cargo hook 52, lead 51b also secured to the hook, head block 50b, heel block 49b mounted on boom 21b and the second drum 42b of cargo winch 33. Tower 1b carries a similar single whip burton including a pair of single drum winches 53c and 53d, respectively, one mounted at the heel of each of booms 21c, 21d; heel blocks 49c, 49d; head blocks 50c, 50d; leads 51c, 51d; and a cargo hook 54.

The foregoing single whip burtons are useful for burtoning light loads and loads requiring more handling speed. Winch control for each normally is provided adjacent the winches at the respective ends of the hatch. They both thus may be used simultaneously or the single whip burton mounted on booms 21c, 21d, may be used concurrently with the heavy lift burtoning rigging for simultaneously moving light and heavy cargo. Moreover, it is a simple matter with the foregoing concurrently rigged light and heavy tackle to switch-over from light to heavy lifts, or vice versa; or to alternate making light and heavy lifts. This flexibility has not heretofore been possible without rerigging one of the burtoning arrangements with a consequent waste of time and effort. The use of double drum cargo winches contributes to this ease in switching from light to heavy lift gear. The double drums of each winch are separately operable and may be separately locked against rotation. It is also preferred to provide an interlock arrangement whereby only one of the double drums on a particular winch is operable at a particular time.

When either of the single whip burtons or the heavy lift apparatus is not in use, it is stowed by hoisting it up to the top of its supporting booms as indicated in FIG. 8 for the single whip burton rigged on booms 21a, 21b. The stowed rigging provides an inboard guying force on the booms from which it is suspended. For this reason, it is not necessary to use a split topping lift and instead of the position indicated in FIG. 8 blocks 26 may be positioned directly over the heel of their respective booms. It also is not necessary to provide the booms with a separate schooner guy to furnish inboard guying force.

Figure 9:
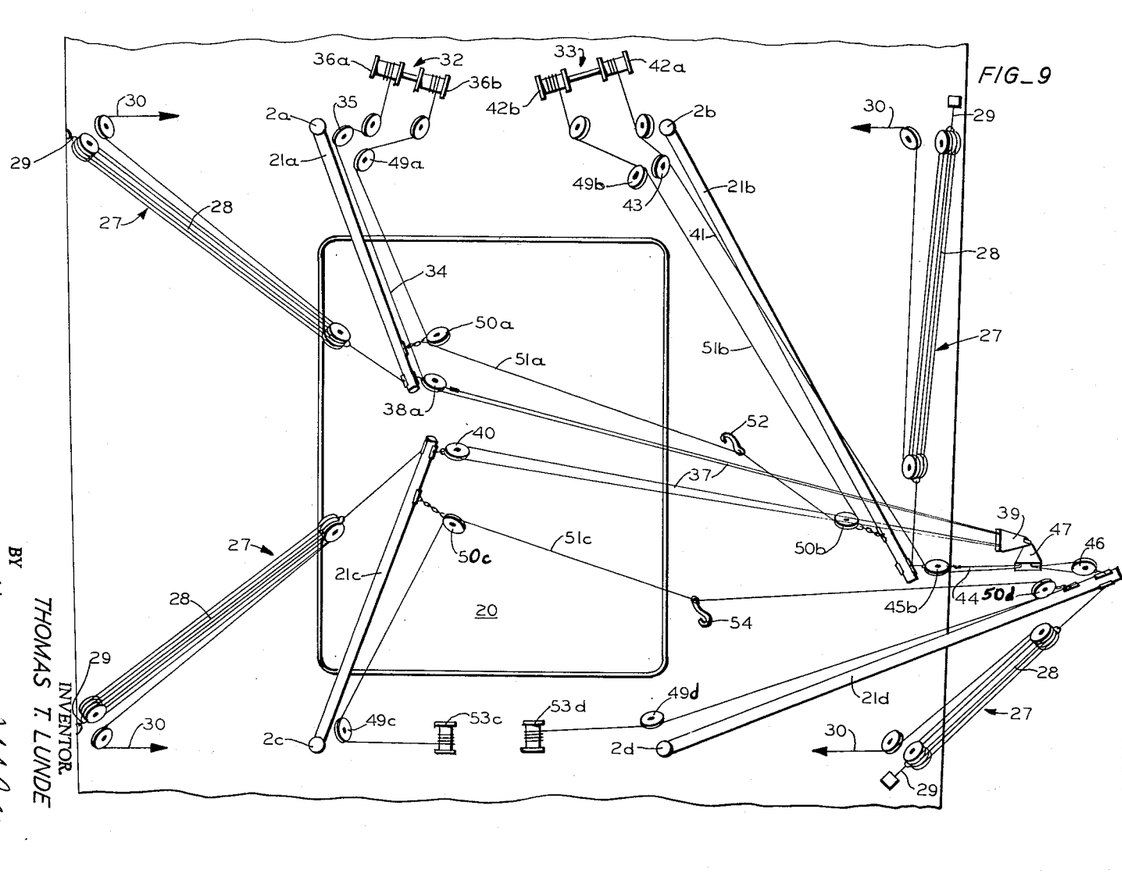
FIG. 9 is a diagrammatic plan view of the apparatus of FIG. 6 with the outboard cargo booms in a modified position for extended outreach.

The heads of outboard booms 21b, 21d as illustrated in FIG. 7, normally are aligned on a line parallel with the vessel centerline and at substantially the same elevation. However, additional outreach may be obtained with the described apparatus by aligning the heads of booms 21b and 21d substantially on the same athwartships line at a uniform elevation as illustrated in FIG. 9. The single whip burton mounted on booms 21a, 21b is stowed to function as a schooner guy providing inboard guying force to the head of boom 21b. The vang 27 controlling transverse movement of boom 21d preferably maintains the included angle between boom 21d and an athwartships line passing through the boom heel at approximately 20° or more.

Figures 10, 11:
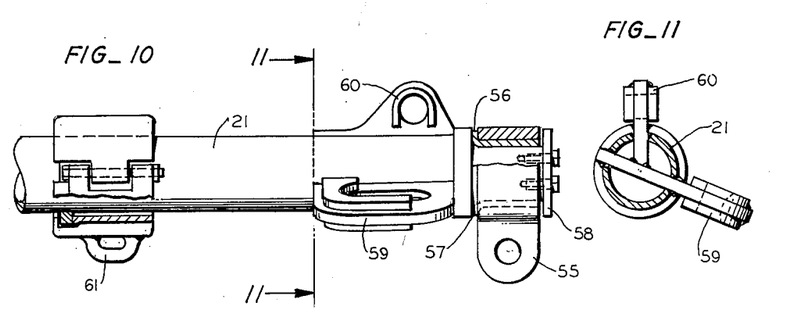
FIG. 10 is a side elevational view of improved heavy lift boom head fittings employed in the present invention.
FIG. 11 is an end view of the boom head fittings of FIG. 10 taken along line 11—11.

It will be apparent from consideration of the foregoing description that no torsional moment is applied to the boom heel swivel fittings 7 since none of the booms is rotated under load with either the arrangement illustrated in FIG. 7 or that illustrated in FIG. 9. The swiveled boom head fittings illustrated in more detail in FIGS. 10, 11 contribute to this future. For the extremely heavy lifts contemplated with the described apparatus, it is essential that the anchor means for the cargo lifting tackles on the boom heads be rotatable with respect to the boom axis. This permits the loading on the boom head to be transmitted axially along the boom without any substantial torsional component. FIG. 10 illustrates a typical boom head fitting including a pivotable cargo ear 55 journaled on sleeve 56 fitting on shoulder 57 formed at the head of boom 21. The cargo ear and sleeve are retained by removable cap 58. The cargo ear thus is freely pivotable about the boom axis and transmits the cargo load axially along the boom without torsional components. A vang ear 59 and a topping lift ear 60 extend outwardly at appropriate angles about the boom axis as appears in FIG. 11. The vang tackle 28 is shackled to vang ear 59 and the topping lift tackle 23 is shackled to the typical topping lift ear 60. An anchor ear 61 secures the head blocks 50 for the single whip burtons.

It is also important in making heavy lifts to provide at least two single blocks 38a, 38b and 45a, 45b for the cargo lifting tackle on the head of those booms to which the cargo leadlines are run. This permits the lead-lines 34, 41 to depend from the boom head at an angle different from that of the depending lifting tackles 37, 44. This feature eliminates binding and excessive wear which otherwise would occur if, for example, a single multiple block were used at the boom head.

The foregoing specific embodiments have been given for illustrative purposes only. Various modifications of the present invention may be obvious to those skilled in this art without departing from the scope of this invention. The invention is not to be construed as being limited to the illustrative embodiments disclosed, but is defined by the following claims.

I claim:

1. An improved shipboard tower for supporting cargo handling booms and tackles on the main deck of a vessel, including a central quadruped structure having spaced legs mounted on and extended upwardly from said main deck said booms being stepped on said legs; means joining said legs at their top ends; and a separate outrigger section extending outwardly from each side of said quadruped structure to each side of said vessel comprising at least one vang post extending upwardly from the side of said vessel and at least one horizontal member interconnecting said vang post and said central quadruped structure.

2. An improved shipboard tower for supporting cargo handling booms and tackles on the main deck of a vessel or its centerline including a central quadruped structure having four spaced legs secured to said main deck, said booms being stepped on said legs; each pair of said legs on each side of said tower being oriented in a vertical plane parallel to the centerline of said vessel and at least one of each pair of said legs being canted to join the other leg of said pair at the top of said tower; a vang post extending upwardly from each side of said vessel; and at least one horizontal member interconnecting at least one of the adjacent legs of said tower to said vang post.

3. A heavy lift shipboard apparatus for handling cargo, including a first quadruped tower having spaced legs mounted on the main deck of a vessel and forward of the cargo; a second quadruped tower mounted on the main deck of a vessel aft of the cargo; a first and a second cargo boom each having a heel end and a head end, each heel end being pivotally mounted on a separate leg of said first tower adjacent to the cargo; a third and a fourth cargo boom similarly mounted on said second tower, said third boom corresponding to said first boom and said fourth boom corresponding to said second boom; a separate topping lift interconnecting the head end of each of said booms with the top of the tower upon which said boom is stepped for selectively pivoting each boom through a vertical arc; a separate vang for each boom for controlling motion of said boom in a horizontal arc; a first cargo lifting tackle suspended from said first boom and said corresponding third boom including a first traveling block; a second lifting tackle suspended from said second boom and from said corresponding fourth boom including a second traveling block; a swiveled cargo hook depending from and jointly supported from said first and second traveling blocks; and separate winch means and lead lines for operating each of said cargo lifting tackles.

4. A heavy lift shipboard apparatus for handling cargo according to claim 3 wherein the head end of said first and said second booms each carry at least separate head blocks on which said lead lines are reeved and on which one end of said lifting tackle is suspended.

5. A heavy lift shipboard apparatus for handling cargo according to claim 3 wherein the head end of each of said booms carries a pivotable cargo ear journaled on the boom head and the head end of each of said first and second booms carries at least two separate head blocks shackled to said cargo ears on which said lead lines are reeved and one end of said lifting tackle suspended.

6. A heavy lift shipboard apparatus for handling cargo, including a first quadruped tower mounted on the main deck of a vessel and forward of the cargo; a second quadruped tower mounted on the main deck of the vessel aft of the cargo; a first and a second cargo boom each having a heel end and a head end, each heel end being pivotally mounted on a separate leg of said first tower adjacent to the cargo; a third and a fourth cargo boom similarly mounted on said second tower, said third boom corresponding to said first boom and said fourth boom corresponding to said second boom; a separate topping lift interconnecting the head end of each of said booms with the top of the tower upon which said boom is stepped for selectively pivoting each boom through a vertical arc; a separate vang for each boom for controlling motion of said boom in a horizontal arc; a first cargo lifting tackle suspended from said first boom and said corresponding third boom including a first traveling block; a second lifting tackle suspended from said second boom and from said corresponding fourth boom including a second traveling block; a swiveled cargo hook depending from and jointly supported from said first and second traveling blocks; separate winch means and lead lines for operating each of said cargo lifting tackles; a first single whip burton suspended from said first and second booms; and a second single whip burton suspended from said third and fourth booms, said burtons normally stowed to provide an inboard guying force to said booms.

7. An improved shipboard cargo handling apparatus on the main deck of a vessel including a tower for supporting cargo handling booms and tackles having a central quadruped structure with four spaced legs mounted on and extending upwardly from said main deck; means joining said legs at their top ends; at least one cargo boom stepped upon one of said legs; a topping lift for said boom anchored to said tower; a separate outrigger section of said tower extending outwardly from each side of said central quadruped structure to each side of said vessel; and a vang for said boom anchored to the adjacent one of said outrigger sections.

8. An improved shipboard cargo handling apparatus on the main deck of a vessel including a tower for supporting cargo handling booms and tackles having a central quadruped structure with four spaced legs mounted on and extending upwardly from said main deck; means joining said legs at their top ends; at least one cargo boom stepped upon each of said legs; a topping lift for each boom anchored to said tower; an outrigger section of said tower extending outwardly from each side of said central quadruped structure to each side of said vessel; a vang for each boom anchored to the adjacent one of said outrigger sections.

9. An improved shipboard cargo handling apparatus according to claim 8 wherein internal diagonal members extend from each of said legs at a point adjacent the heel of each of said booms and join together at said means joining said legs on the centerline of said vessel thereby providing a triangular opening for free visibility along the vessel centerline.

10. A heavy lift shipboard apparatus for handling cargo, including a first quadruped tower mounted on the main deck of a vessel and forward of the cargo; a second quadruped tower mounted on the main deck of a vessel aft of the cargo; a first and a second cargo boom each having a heel end and a head end, each heel end being pivotally mounted on a separate leg of said first tower adjacent to the cargo; a third and a fourth cargo boom similarly mounted on said second tower, said third boom corresponding to said first boom and said fourth boom corresponding to said second boom; a separate topping lift interconnecting the head end of each of said booms with the top of the tower upon which said boom is stepped for selectively pivoting each boom through a vertical arc; a separate vang for each boom for controlling motion of said boom in a horizontal arc; a first cargo lifting tackle suspended from said first boom and said corresponding third boom including a first traveling block; a second lifting tackle suspended from said second boom and from said corresponding fourth boom including a second traveling block; a swiveled cargo hook depending from and jointly supported from said first and second traveling blocks; separate winch means and leadlines for operating each of said cargo lifting tackles; said winch means and each of said topping lifts and vangs being operable from a single operating station.

References Cited in the file of this patent

UNITED STATES PATENTS

| 655,707 | Haynes | Aug. 14, 1900 |
| 1,015,240 | Miller | Jan. 16, 1912 |
| 1,681,533 | Giliasso | Aug. 21, 1928 |
| 2,222,066 | Brown | Nov. 19, 1940 |
| 2,354,182 | Christoffersen | July 25, 1944 |
| 2,754,975 | Farrell | July 17, 1956 |

FOREIGN PATENTS

| 2,298,594 | Great Britain | 1929 |

UNITED STATES PATENT OFFICE
CERTIFICATE OF CORRECTION

Patent No. 3,172,543

March 9, 1965

Thomas T. Lunde

It is hereby certified that error appears in the above numbered patent requiring correction and that the said Letters Patent should read as corrected below.

Column 6, line 24, for "future" read -- feature --; line 74, for "or" read -- on --; column 7, line 35, after "at least" insert -- two --.

Signed and sealed this 7th day of December 1965.

(SEAL)
Attest:

ERNEST W. SWIDER
Attesting Officer

EDWARD J. BRENNER
Commissioner of Patents